(12) United States Patent
Chiang et al.

(10) Patent No.: US 8,505,099 B2
(45) Date of Patent: Aug. 6, 2013

(54) MACHINE-IMPLEMENTED METHOD AND SYSTEM FOR DETERMINING WHETHER A TO-BE-ANALYZED SOFTWARE IS A KNOWN MALWARE OR A VARIANT OF THE KNOWN MALWARE

(75) Inventors: Yi-Ta Chiang, Hsinchu County (TW); Ying-Dar Lin, Taipei (TW); Yu-Sung Wu, Hsinchu (TW); Yuan-Cheng Lai, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 181 days.

(21) Appl. No.: 13/112,249

(22) Filed: May 20, 2011

(65) Prior Publication Data

US 2012/0124667 A1     May 17, 2012

(30) Foreign Application Priority Data

Nov. 12, 2010 (TW) .............................. 99139009 A

(51) Int. Cl.
| | | |
|---|---|---|
| G06F 11/00 | (2006.01) | |
| G06F 7/04 | (2006.01) | |
| G08B 23/00 | (2006.01) | |
| G06F 17/30 | (2006.01) | |

(52) U.S. Cl.
USPC .................. 726/24; 726/22; 726/23; 726/25; 726/26; 709/224

(58) Field of Classification Search
None
See application file for complete search history.

(56) References Cited

U.S. PATENT DOCUMENTS

| | | | | |
|---|---|---|---|---|
| 7,809,670 | B2 | 10/2010 | Lee et al. | |
| 8,205,256 | B2 * | 6/2012 | Ahn et al. ....................... | 726/22 |
| 8,332,944 | B2 * | 12/2012 | Rozenberg et al. ............ | 726/24 |
| 2003/0200464 | A1 * | 10/2003 | Kidron ........................... | 713/201 |
| 2007/0204257 | A1 * | 8/2007 | Kinno et al. ................... | 717/100 |
| 2008/0120720 | A1 * | 5/2008 | Guo et al. ....................... | 726/23 |
| 2009/0235357 | A1 | 9/2009 | Ebringer et al. | |
| 2009/0254989 | A1 * | 10/2009 | Achan et al. .................... | 726/22 |
| 2009/0313700 | A1 * | 12/2009 | Horne ............................. | 726/24 |
| 2010/0175132 | A1 * | 7/2010 | Zawadowskiy et al. ........ | 726/23 |
| 2010/0229239 | A1 * | 9/2010 | Rozenberg et al. ............. | 726/24 |
| 2011/0302654 | A1 * | 12/2011 | Miettinen ....................... | 726/23 |

OTHER PUBLICATIONS

"Malicious executables classification based on behavioral factor analysis," Hengli Zhao, et al., presented at the 2010 International Conference on e-Education, e-Business, e-Management and e-Learning.
"Malware Obfuscation Detection via Maximal Patterns," Jian Li, et al., presented at the 2009 Third International Symposium on Intelligent Information Technology Application.
"Visual Analysis of Malware Behavior Using Treemaps and Thread Graphs" Phillipp Trinius, et al., presented at the 6th International Workshop on Visualization for Cyber Security Oct. 11, 2009.
"A Fast Flowgraph Based Classification System for Packed and Polymorphic Malware on the Endhost," Silvio Cesare and Yang Xiang, presented at the 2010 24th IEEE International Conference on Advanced Information Networking and Applications.
"Automated Classification and Analysis of Internet Malware," Michael Bailey, et al., Apr. 26, 2007.

* cited by examiner

Primary Examiner — Nathan Flynn
Assistant Examiner — Trang Doan
(74) Attorney, Agent, or Firm — DLA Piper LLP (US)

(57) ABSTRACT

A machine-implemented method for determining whether a to-be-analyzed software is a known malware or a variant of the known malware includes the steps of: (A) configuring a processor to execute the to-be-analyzed software, and obtain a to-be-analyzed system call sequence that corresponds to the to-be-analyzed software with reference to a plurality of system calls made in sequence as a result of executing the to-be-analyzed software; (B) configuring the processor to determine a degree of similarity between the to-be-analyzed system call sequence and a reference system call sequence that corresponds to the known malware; and (C) configuring the processor to determine that the to-be-analyzed software is neither the known malware nor a variant of the known malware when the degree of similarity determined in step (B) is not greater than a predefined similarity threshold value.

5 Claims, 6 Drawing Sheets

| system call | NtClose | NtCreateFile | NtDeleteFile | NtLoadKey | ... |
|---|---|---|---|---|---|
| order in sequence | 1 | 2 | 3 | 4 | ... |
| system call ID | 1 | 10 | 11 | 12 | ... |

FIG. 4

MACHINE-IMPLEMENTED METHOD AND SYSTEM FOR DETERMINING WHETHER A TO-BE-ANALYZED SOFTWARE IS A KNOWN MALWARE OR A VARIANT OF THE KNOWN MALWARE

CROSS-REFERENCE TO RELATED APPLICATION

This application claims priority of Taiwanese Application No. 099139009, filed on Nov. 12, 2010.

BACKGROUND OF THE INVENTION

1. Field of the Invention

The invention relates to a machine-implemented method for determining whether a to-be-analyzed software is a known malware, more particularly to a machine-implemented method for determining whether a to-be-analyzed software is a known malware or a variant of the known malware.

2. Description of the Related Art

With the convenience of the Internet also come safety threats posed by malicious software and programs (collectively referred to as malware).

A botnet is an autonomous network of compromised zombie computers running software agents, commonly referred to as robots or bots, under the control of an attacker. Botnets are generally for nefarious purposes, such as sending spam messages and conducting information theft. These attacks might lead to crippling of the Internet or even financial losses. Therefore, preventive measures such as botnet detection and removal are constantly under study and research in the relevant field.

Conventionally, there are two approaches to detecting botnets, namely a static analysis approach and a dynamic analysis approach. In the static analysis approach, a to-be-analyzed binary (or code) is analyzed to determine if there are suspicious instruction sequences or if there are well-known signatures of known botnets. The static analysis approach does not consider what happens after the to-be-analyzed binary is executed, and does not produce accurate results if the to-be-analyzed binary is a botnet agent binary that has undergone obfuscation (e.g., that has been encrypted or compressed). On the other hand, the dynamic analysis approach executes the to-be-analyzed binary and monitors the runtime behavior (e.g., calling of application program interface (API), modifying system registry) of the to-be-analyzed binary in order to determine if it resembles a known botnet. However, the conventional dynamic analysis approach is rough and does not generate highly accurate results.

SUMMARY OF THE INVENTION

Therefore, the object of the present invention is to provide a system and a machine-implemented method for determining whether a to-be-analyzed software is a known malware or a variant of the known malware with increased accuracy.

According to one aspect of the present invention, there is provided a machine-implemented method for determining whether a to-be-analyzed software is a known malware or a variant of the known malware. The machine-implemented method includes the steps of: (A) configuring a processor to execute the to-be-analyzed software, and obtain a to-be-analyzed system call sequence that corresponds to the to-be-analyzed software with reference to a plurality of system calls made in sequence as a result of executing the to-be-analyzed software; (B) configuring the processor to determine a degree of similarity between the to-be-analyzed system call sequence and a reference system call sequence that corresponds to the known malware; and (C) configuring the processor to determine that the to-be-analyzed software is neither the known malware nor a variant of the known malware when the degree of similarity determined in step (B) is not greater than a predefined similarity threshold value.

According to another aspect of the present invention, there is provided a system for determining whether a to-be-analyzed software is a known malware or a variant of the known malware. The system includes a database, a recording module, and an analyzing module. The database has a reference system call sequence that corresponds to the known malware established therein. The recording module is for executing the to-be-analyzed software, and obtains a to-be-analyzed system call sequence that corresponds to the to-be-analyzed software with reference to a plurality of system calls made in sequence as a result of executing the to-be-analyzed software. The analyzing module is coupled to the database and the recording module for determining a degree of similarity between the to-be-analyzed system call sequence and the reference system call sequence, and further determines that the to-be-analyzed software is neither the known malware nor a variant of the known malware when the degree of similarity thus determined is not greater than a predefined similarity threshold value.

BRIEF DESCRIPTION OF THE DRAWINGS

Other features and advantages of the present invention will become apparent in the following detailed description of the preferred embodiment with reference to the accompanying drawings, of which:

FIG. 4 is a schematic diagram illustrating a table with exemplary system calls in a to-be-analyzed system call sequence corresponding to the known malware.

DETAILED DESCRIPTION OF THE PREFERRED EMBODIMENT

Figure 1:
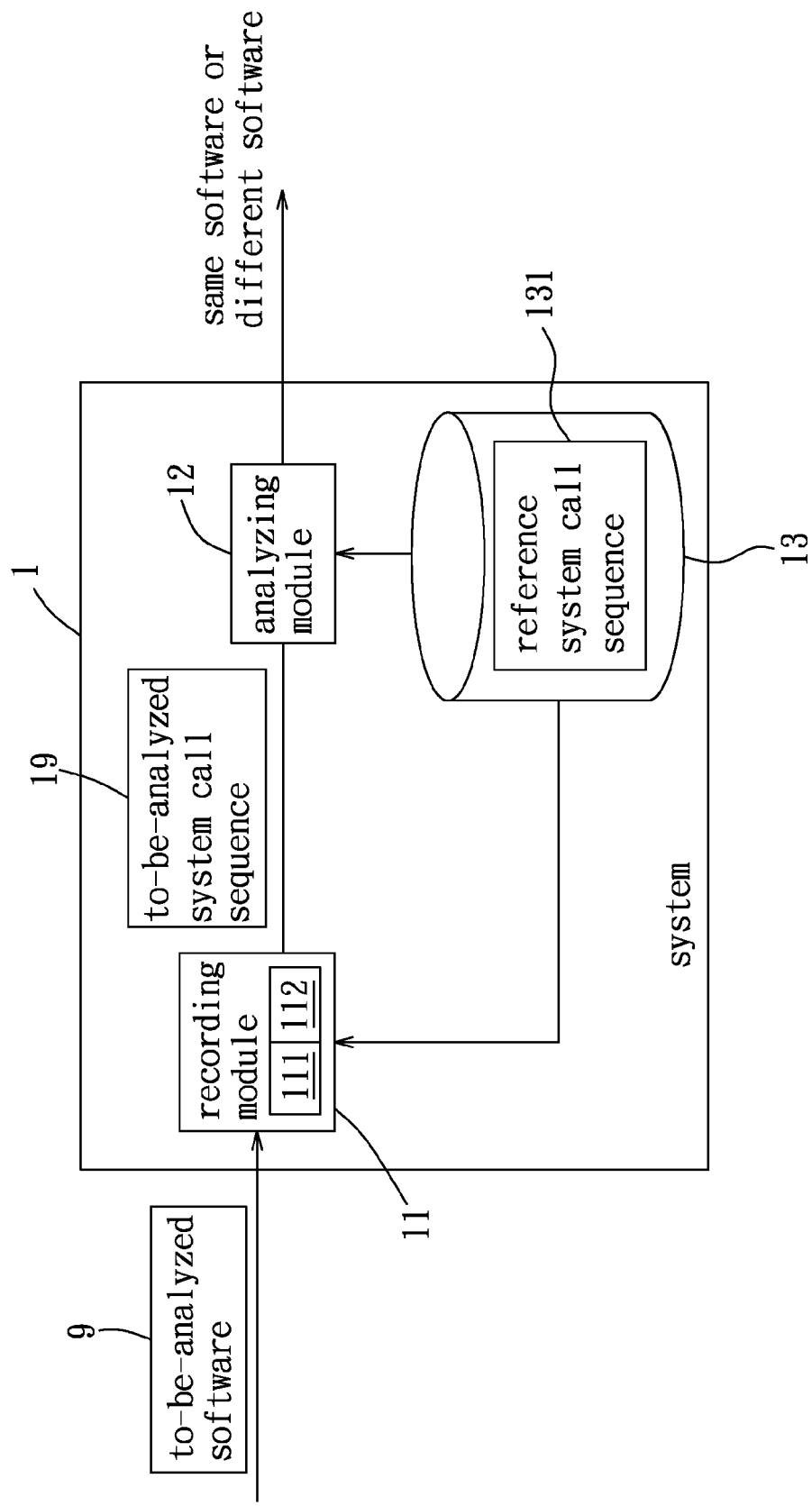
FIG. 1 is a block diagram illustrating a system for determining whether a to-be-analyzed software is a known malware or a variant of the known malware according to the preferred embodiment of the present invention.

With reference to FIG. 1, according to the preferred embodiment of the present invention, a system 1 for determining whether a to-be-analyzed software 9 is a known malware (e.g., a bot) or a variant of the known malware includes a database 13, a recording module 11 and an analyzing module 12. The to-be-analyzed software 9 may originally be resident in a storage space (not shown). According to the present invention, the system 1 achieves the determination by using three primary principles, namely segment identification of system call sequence, a similarity matching algorithm based on longest common subsequence (LCS), and shift analysis. These will become clear in the following description with reference to the preferred embodiment and the accompanying drawings. The system 1 is capable of determining not only if the to-be-analyzed software 9 is a known malware, but also whether the to-be-analyzed software 9 is a variant of a known malware. The variant may come as a result of using an obfuscation tool (e.g., a packer) to insert additional system calls, or modifying the source code of an existing (ancestor) bot.

The database 13 has established therein at least one reference system call sequence 131 that corresponds to the known malware.

The recording module 11 is for executing the to-be-analyzed software 9, and obtains a to-be-analyzed system call sequence 19 that corresponds to the to-be-analyzed software 9 with reference to a plurality of system calls made in sequence as a result of executing the to-be-analyzed software 9. Preferably, the recording module 11 records the plurality of system calls made in sequence as a result of executing the to-be-analyzed software 9, and extracts, from the plurality of system calls thus recorded, a primary portion that corresponds to the kernel functionality of the to-be-analyzed software 9 so as to obtain the to-be-analyzed system call sequence 19.

Figure 2:
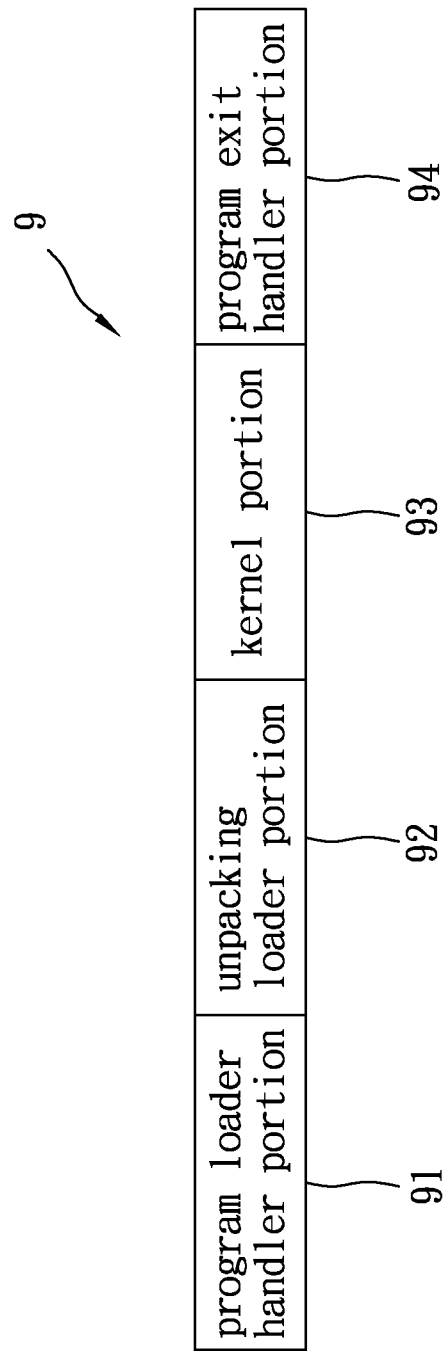
FIG. 2 is a schematic diagram illustrating four portions of a sequence of system calls made by a program.

With reference to FIG. 2, generally speaking, the system calls made by a program can be divided into four portions. The first portion is a program loader portion 91, where system calls are made by the operating system (e.g., Windows®) to load the necessary dynamic link libraries (DLLs) and allocate the required memory space, etc. The second portion is an unpacking loader portion 92, where system calls are made to prepare a suitable environment for execution of the source program, such as unpacking compressed binary into a text segment. The third portion is the kernel portion 93 referred to above, where system calls are made to perform the underlying kernel functionality of the program. The fourth portion is a program exit handler portion 94, where system calls are used to release the allocated resource and to exit the program. If the program is obfuscated by an obfuscation tool such that additional system calls are introduced, in order to maintain the kernel functionality of the program, the system calls made during the kernel portion 93 are always kept intact. The present invention utilizes this particular characteristic to determine whether the to-be-analyzed software 9 is a known malware or a variant of the known malware. In this embodiment, the kernel portion 93 is the primary portion that is extracted to serve as the to-be-analyzed system call sequence 19. The extraction of the to-be-analyzed system call sequence 19 is referred to above as the segment identification of system call sequence.

Since the unpacking loader portion 92 varies when the same malware is obfuscated by different obfuscation tools, a profile needs to be built for each different obfuscation tool for proper identification of the unpacking loader portion 92 and for effective extraction of the kernel portion 93. In order to increase the accuracy in extracting the kernel portion 93 from the sequence of system calls made by the to-be-analyzed software 9 to serve as the to-be-analyzed system call sequence 19, a profile for each different obfuscation tool needs to be established to effectively remove the non-relevant segments 91, 92, 94.

The analyzing module 12 is coupled to the database 13 and the recording module 11 for determining a degree of similarity (S) between the to-be-analyzed system call sequence 19 and the reference system call sequence 131. The analyzing module 12 further determines that the to-be-analyzed software 9 is neither the known malware nor a variant of the known malware when the degree of similarity (S) thus determined is not greater than a predefined similarity threshold value ($T_S$).

Specifically, the analyzing module 12 determines the degree of similarity (S) by determining a longest common subsequence (LCS) between the to-be-analyzed system call sequence 19 and the reference system call sequence 131, and computes the degree of similarity (S) according to S=L/min (|X|, |Y|), where "X" represents the to-be-analyzed system call sequence 19, "Y" represents the reference system call sequence 131, "L" represents a length of the longest common subsequence, and "min(|X|, |Y|)" represents a length of a shorter one of the to-be-analyzed system call sequence 19 and the reference system call sequence 131. This is the similarity matching algorithm referred to above.

The analyzing module 12 further performs the following steps when the degree of similarity (S) determined thereby is greater than the predefined similarity threshold value ($T_S$): obtaining, for each element of the longest common subsequence, an original position in each of the to-be-analyzed system call sequence 19 and the reference system call sequence 131; determining, for each element of the longest common subsequence, a difference between the original positions in the to-be-analyzed system call sequence 19 and the reference system call sequence 131; determining a total number of unique values of the differences found for the longest common subsequence; determining a shifting degree (R) between the to-be-analyzed system call sequence 19 and the reference system call sequence 131 according to R=N/L, where "N" represents the total number of unique values of the differences and "L" represents the length of the longest common subsequence; determining that the to-be-analyzed software 9 is neither the known malware nor a variant of the known malware when the shifting degree (R) thus determined is greater than a predefined shifting threshold value ($T_R$); and determining that the to-be-analyzed software 9 is the known malware or a variant of the known malware when the shifting degree (R) thus determined is not greater than the predefined shifting threshold value ($T_R$). This is the shifting analysis referred to above.

The predefined similarity threshold value ($T_S$) ranges between 0.58 and 0.63, and the predefined shifting threshold value ($T_R$) ranges between 0.05 and 0.08. Preferably, the predefined similarity threshold value ($T_S$) is 0.6, and the predefined shifting threshold value ($T_R$) is 0.06.

Figure 3A:
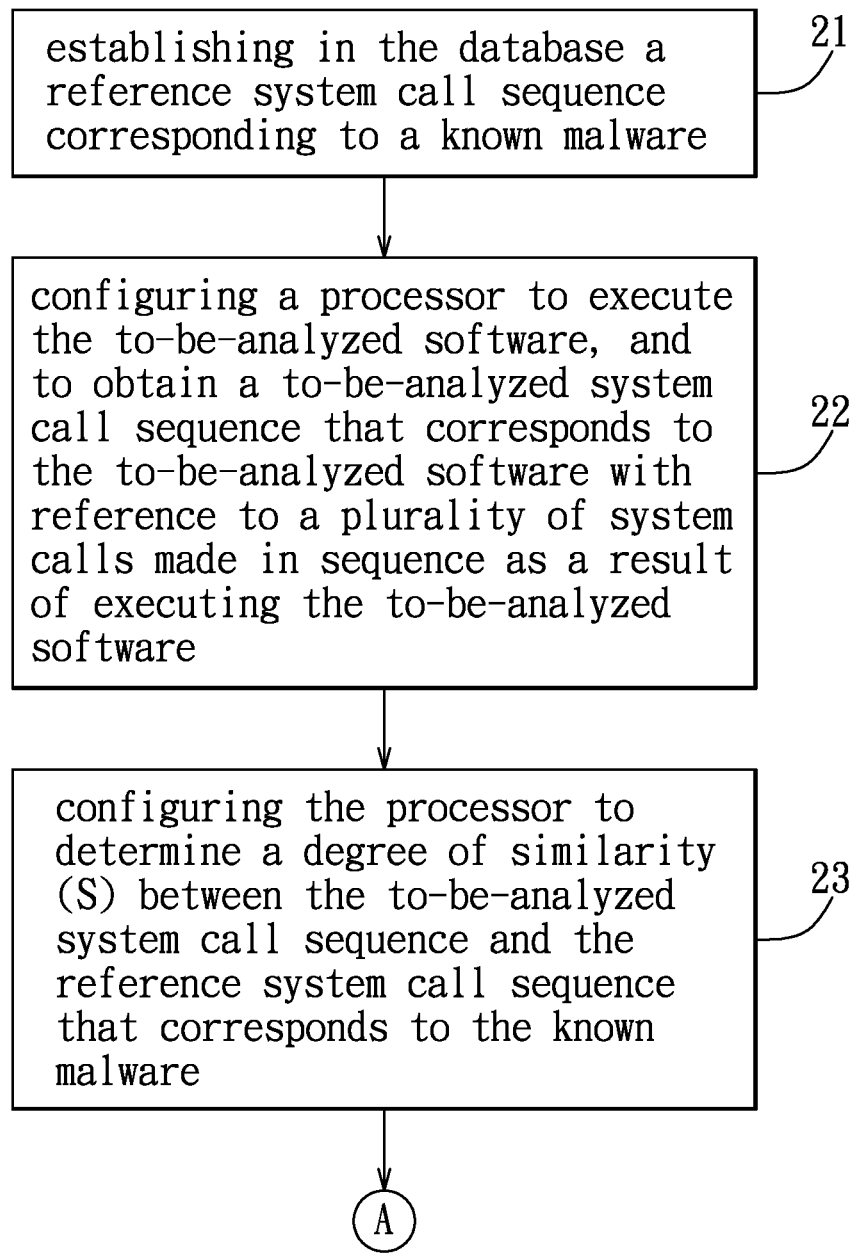
FIGS. 3A and 3B collectively illustrate a flow chart illustrating a machine-implemented method for determining whether a to-be-analyzed software is a known malware or a variant of the known malware according to the preferred embodiment of the present invention.
Figure 3B:
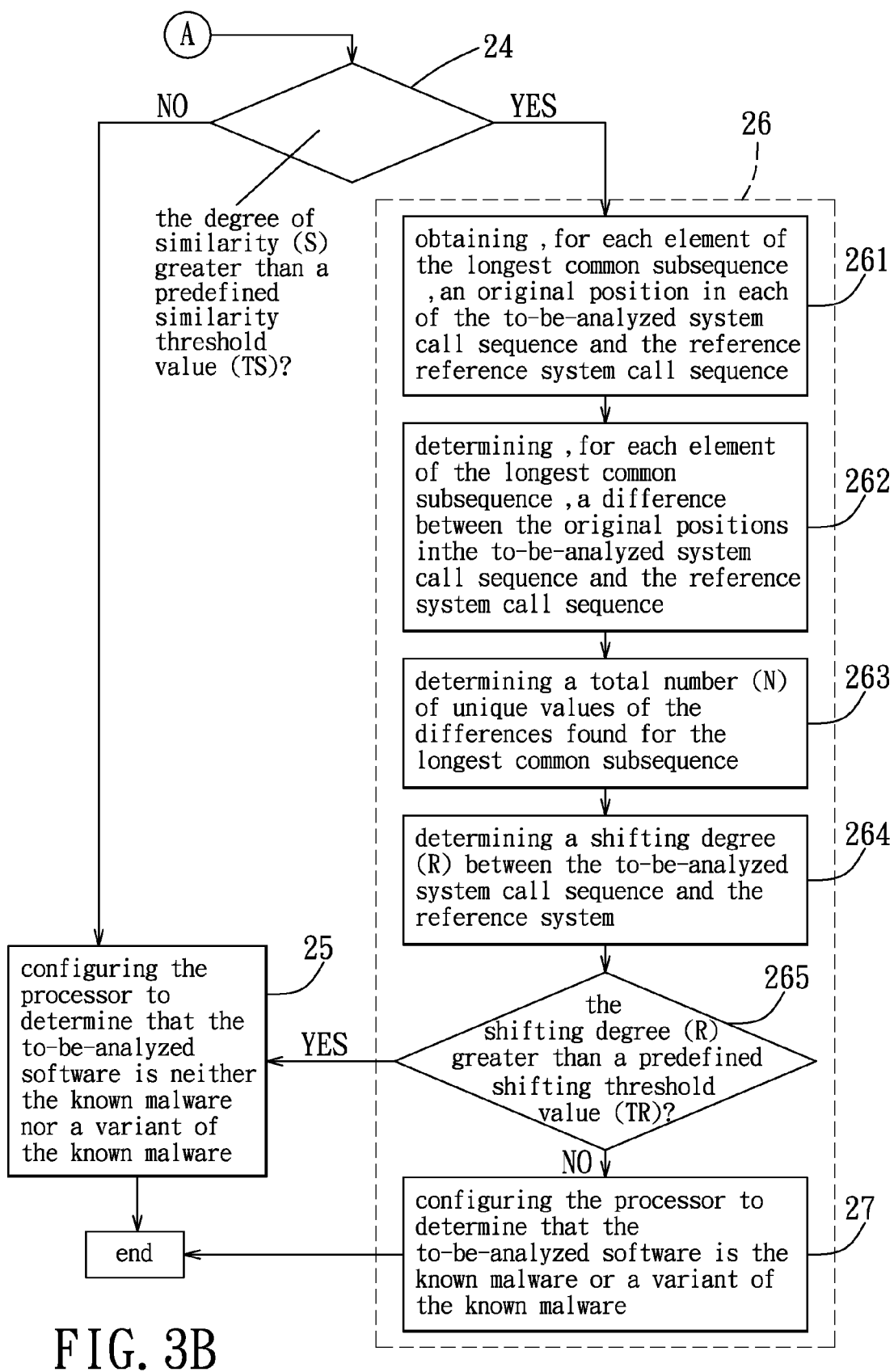

Referring to FIGS. 3A and 3B, the present invention will be more clearly understood with reference to the following descriptions in connection with the machine-implemented method according to the preferred embodiment of the present invention. The machine-implemented method is for determining whether the to-be-analyzed software 9 is a known malware or a variant of the known malware, and includes the following steps.

First, in step 21, a reference system call sequence 131 corresponding to a known malware is established in the database 13. The machine-implemented method is then performed to determine whether the to-be-analyzed software 9 is the known malware or a variant of the known malware. One should readily appreciate that there may be multiple reference system call sequences 131 respectively corresponding to multiple different known malwares established in the database 13, and the machine-implemented method of the present invention is for determining whether the to-be-analyzed software 9 is one of the known malwares or a variant of one of the known malwares.

Next, in step 22, a processor (not shown) (or the recording module 11 of the system 1 shown in FIG. 1) is configured to execute the to-be-analyzed software 9, and to obtain a to-be-analyzed system call sequence 19 that corresponds to the to-be-analyzed software 9 with reference to a plurality of system calls made in sequence as a result of executing the to-be-analyzed software 9.

Figure 5:
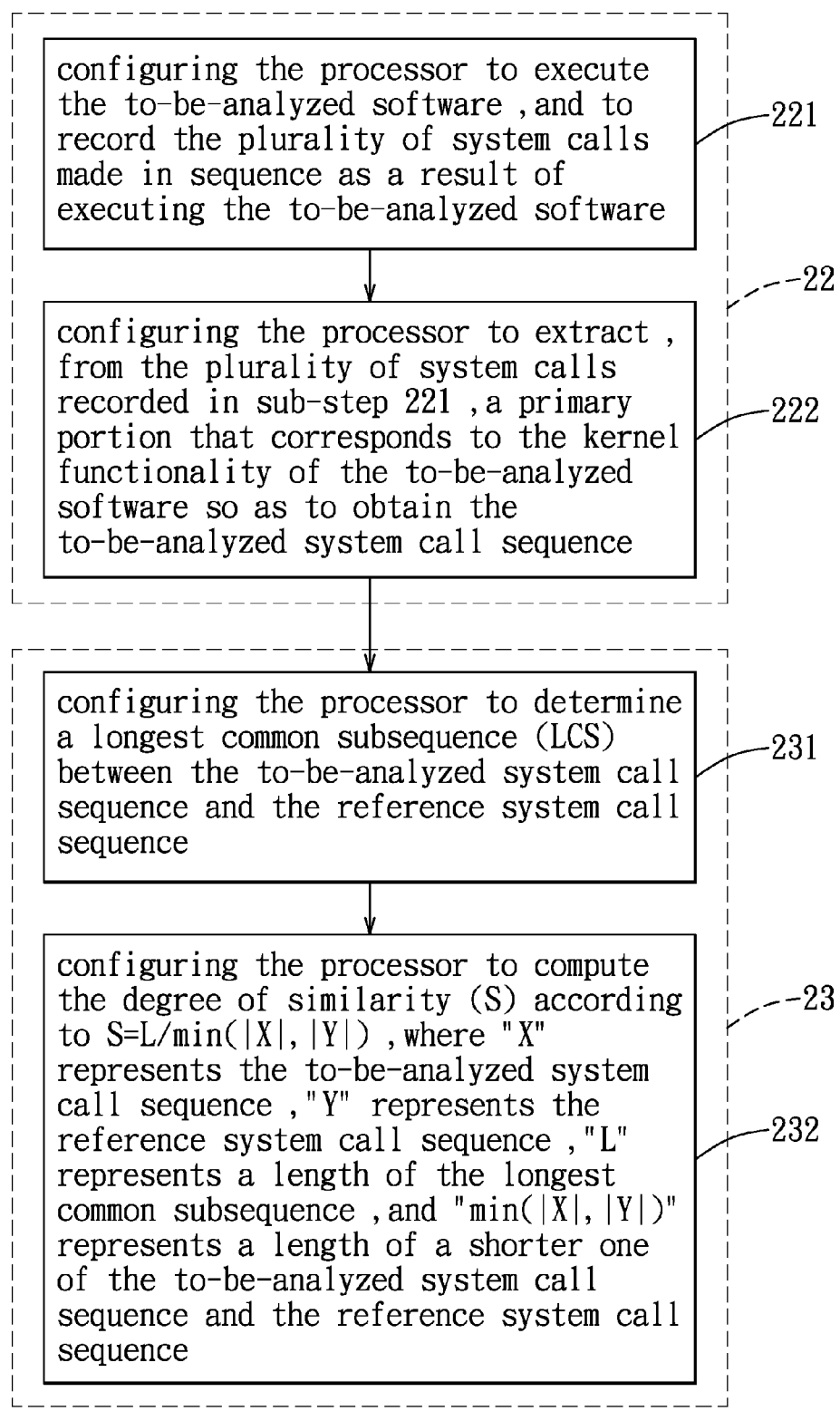
FIG. 5 is a flow chart illustrating sub-steps of step 22 and step 23 of the machine-implemented method shown in FIG. 2.

With reference to FIG. 5, step 22 includes two sub-steps in this embodiment. In sub-step 221, the processor (or the recording module 11 of the system 1 shown in FIG. 1) is configured to execute the to-be-analyzed software 9, and to record the plurality of system calls made in sequence as a result of executing the to-be-analyzed software 9. In sub-step 222, the processor (or the recording module 11 of the system 1 shown in FIG. 1) is configured to extract, from the plurality of system calls recorded in sub-step 221, a primary portion 111 that corresponds to the kernel functionality of the to-be-analyzed software 9 so as to obtain the to-be-analyzed system call sequence 19. In this embodiment, the primary portion 111 corresponds to the kernel portion 93 shown in FIG. 2. The remaining of the plurality of system calls recorded in sub-step 221 include the program loader portion 91, the unpacking loader portion 92, and the program exit handler portion 94 of FIG. 2, and are collectively referred to as a secondary portion 112.

The reason behind taking only the kernel portion 93 as the primary portion 111 to serve as the to-be-analyzed system call sequence 19 and neglecting the secondary portion 112 is that, as described previously with reference to FIG. 2, the program loader portion 91 and the program exit handler portion 94 of the secondary portion 112 of the system calls are common to nearly all programs and executable files and are irrelevant to the identification of the known malware, and that while the unpacking loader portion 92 of the secondary portion 112 may vary among programs obfuscated using different obfuscation tools, the system calls made to perform the underlying kernel functionality of the program (i.e., the kernel portion 93) remain substantially unchanged for a known malware and its variants. As such, the reference system call sequence 131 established in the database 13 in step 21 also only corresponds to the kernel portion 93 of the system calls made by the known malware. Using only the primary portion 111 as the basis for the determination increases both the speed and the success rate of the identification.

In the system 1 described above, after sub-step 222 is performed by the recording module 11, the to-be-analyzed system call sequence 19 is transmitted to the analyzing module 12. FIG. 4 shows a table with exemplary system calls 10 in the to-be-analyzed system call sequence 19 (e.g., NtClose, NtCreateFile, NtDeleteFile, NtLoadKey, etc.). The actual to-be-analyzed system call sequence 19 in this embodiment is a sequence of the system call identifications (IDs) corresponding to the system calls 10. Therefore, in this example, the to-be-analyzed system call sequence 19 is (1, 10, 11, 12, . . . ). In this embodiment, the processor (or the recording module 11 shown in FIG. 1) utilizes the "Pin" tool, a dynamic binary instrumentation tool developed by Intel® for dynamic instrumentation of programs, to record the system calls and the corresponding system call IDs made as a result of executing the to-be-analyzed software 9.

Subsequently, in step 23, the processor (or specifically, the analyzing module 12 shown in FIG. 1) is configured to determine a degree of similarity (S) between the to-be-analyzed system call sequence 19 and the reference system call sequence 131 that corresponds to the known malware. With reference to FIG. 5, step 23 includes two sub-steps in this embodiment. In sub-step 231, the processor (or the analyzing module 12 shown in FIG. 1) is configured to determine a longest common subsequence (LCS) between the to-be-analyzed system call sequence 19 and the reference system call sequence 131. In sub-step 232, the processor (or the analyzing module 12 shown in FIG. 1) is configured to compute the degree of similarity (S) according to the following equation: $S=L/\min(|X|, |Y|)$, where "X" represents the to-be-analyzed system call sequence 19, "Y" represents the reference system call sequence 131, "L" represents a length of the longest common subsequence, and "$\min(|X|, |Y|)$" represents a length of a shorter one of the to-be-analyzed system call sequence 19 and the reference system call sequence 131. The value of the degree of similarity (S) ranges between 0 and 1, and S=1 indicates that X is a variant of Y or that Y is a variant of X.

For instance, assuming that X (i.e., the to-be-analyzed system call sequence 19) is (1, 10, 11, 12, 2, 3, 18, 4, 20, 21, 5), while Y (i.e., the reference system call sequence 131) is (1, 2, 3, 4, 5), the longest common subsequence (LCS) between X and Y is (1, 2, 3, 4, 5) with a length "L" of 5, and min (|X|, |Y|) is 5. Therefore, S=1, and X is a variant of Y.

Next, in step 24, the processor (or the analyzing module 12 shown in FIG. 1) is configured to determine whether or not the degree of similarity (S) determined in step 23 is greater than a predefined similarity threshold value ($T_S$). In this embodiment, the predefined similarity threshold value ($T_S$) ranges between 0.58 and 0.63. Preferably, the predefined similarity threshold value ($T_S$) is 0.6. In the negative, i.e., if it is determined in step 24 that the degree of similarity (S) is smaller than or equal to the predefined similarity threshold value ($T_S$), the flow goes to step 25, where the processor is configured to determine that the to-be-analyzed software 9 is neither the known malware nor a variant of the known malware. If affirmative, i.e., if it is determined in step 24 that the degree of similarity (S) is greater than the predefined similarity threshold value ($T_S$), the flow goes to step 26, where the processor (or the analyzing module 12 shown in FIG. 1) is configured to perform the following sub-steps.

In sub-step 261, it is obtained, for each element of the longest common subsequence, an original position in each of the to-be-analyzed system call sequence 19 and the reference system call sequence 131. In the following description, let the sequence $(a_1, a_2, a_3, \ldots, a_L)$ represent the original positions of the elements of the longest common subsequence in the to-be-analyzed system call sequence 19, and let the sequence $(b_1, b_2, b_3, \ldots, b_L)$ represent the original positions of the elements of the longest common subsequence in the reference system call sequence 131.

In sub-step 262, it is determined, for each element of the longest common subsequence, a difference between the original positions in the to-be-analyzed system call sequence 19 and the reference system call sequence 131. In other words, the differences $(a_1-b_1, a_2-b_2, a_3-b_3, \ldots, a_L-b_L)$ are determined in sub-step 262.

In sub-step 263, a total number (N) of unique values of the differences found for the longest common subsequence is determined. The total number (N) is a positive integer.

In sub-step 264, a shifting degree (R) between the to-be-analyzed system call sequence 19 and the reference system call sequence 131 is determined according to R=N/L.

For the above-described example, where the to-be-analyzed system call sequence 19 (X) is (1, 10, 11, 12, 2, 3, 18, 4, 20, 21, 5), the reference system call sequence 131 (Y) is (1, 2, 3, 4, 5), and the longest common subsequence (LCS) between X and Y is (1, 2, 3, 4, 5), the original positions of the elements of the longest common subsequence in the to-be-analyzed system call sequence 19 $(a_1, a_2, a_3, \ldots, a_L)$ is (1, 5, 6, 8, 11), and the original positions of the elements of the longest common subsequence in the reference system call sequence 131

($b_1, b_2, b_3, \ldots, b_L$) is (1, 2, 3, 4, 5). Therefore, the differences between the original positions in the to-be-analyzed system call sequence 19 and the reference system call sequence 131 ($a_1-b_1, a_2-b_2, a_3-b_3, \ldots, a_L-b_L$) are (0, 3, 3, 4, 6), and the total number (N) of unique values of the differences found for the longest common subsequence is 4. As such, the shifting degree (R) between the to-be-analyzed system call sequence 19 and the reference system call sequence 131 is determined by R=4/5=0.8.

Subsequently, in sub-step 265, it is determined whether or not the shifting degree (R) determined in sub-step 264 is greater than a predefined shifting threshold value ($T_R$). In this embodiment, the predefined shifting threshold value ($T_R$) ranges between 0.05 and 0.08. Preferably, the predefined shifting threshold value ($T_R$) is 0.06.

If affirmative, i.e., the shifting degree (R) determined in sub-step (264) is greater than the predefined shifting threshold value ($T_R$), the flow goes to step 25, where it is determined that the to-be-analyzed software 9 is neither the known malware nor a variant of the known malware. On the other hand, in the negative, i.e, the shifting degree (R) determined in sub-step (264) is smaller than or equal to the predefined shifting threshold value ($T_R$), the flow goes to step 27, where it is determined that the to-be-analyzed software 9 is the known malware or a variant of the known malware.

Taking the previous example, where the degree of similarity (S) is 1, and the shifting degree (R) is 0.8, although there is a 100% similarity between the to-be-analyzed system call sequence 19 and the reference system call sequence 131, there is a shifting degree (R) that is far greater than the predefined shifting threshold value ($T_R$), meaning that as there are multiple additional system calls (to be exact, six additional system calls in this example, namely system call IDs 10, 11, 12, 18, 20 and 21) in the to-be-analyzed system call sequence 19 as compared to the reference system call sequence 131, the shiftings resulted in the system calls that are made for both the to-be-analyzed software 9 and the known malware (or a variant thereof) are too great so as to render the to-be-analyzed software 9 be deemed as neither the known malware nor a variant of the known malware. In other words, even if the degree of similarity (S) between the to-be-analyzed system call sequence 19 and the reference system call sequence 131 is very high, or even indicating 100% similarity, the processor (or the analyzing module 12 shown in FIG. 1) will determine that the to-be-analyzed software 9 is neither the known malware nor a variant of the known malware when the shifting degree (R) exceeds the predefined shifting threshold value ($T_R$).

It should be noted herein that in practice, a virtual machine, such as VirtualBox, may be used for execution of the to-be-analyzed software 9 in order to obtain the to-be-analyzed system call sequence 19 so that in case where the to-be-analyzed software 9 is a malware, the system 1 is not contaminated. In addition, the virtual machine may be connected to the Internet through a firewall to allow connection access to the to-be-analyzed software 9 while preventing malicious traffic from interfering with the determination process.

In summary, the present invention utilizes segment identification of system call sequence, a similarity matching algorithm based on longest common subsequence (LCS), and a shift analysis to determine whether a to-be-analyzed software 9 is a known malware or a variant of the known malware. In addition, by extracting, from a plurality of system calls recorded as a result of executing the to-be-analyzed software 9, a primary portion 111 that corresponds to the kernel functionality of the to-be-analyzed software 9 so as to obtain the to-be-analyzed system call sequence 19, both the speed and the success rate of the identification can be increased.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A machine-implemented method for determining whether a to-be-analyzed software is a known malware or a variant of the known malware, the machine-implemented method comprising the steps of:
   (A) configuring a processor to execute the to-be-analyzed software, and obtain a to-be-analyzed system call sequence that corresponds to the to-be-analyzed software with reference to a plurality of system calls made in sequence as a result of executing the to-be-analyzed software;
   (B) configuring the processor to determine a degree of similarity between the to-be-analyzed system call sequence and a reference system call sequence that corresponds to the known malware; and
   (C) configuring the processor to determine that the to-be-analyzed software is neither the known malware nor a variant of the known malware when the degree of similarity determined in step (B) is not greater than a predefined similarity threshold value;
   wherein step (B) includes the sub-steps of:
   (B-1) determining a longest common subsequence (LCS) between the to-be-analyzed system call sequence and the reference system call sequence; and
   (B-2) computing the degree of similarity (S) according to S=L/min(|X|,|Y|), where "X" represents the to-be-analyzed system call sequence, "Y" represents the reference system call sequence, "L" represents a length of the longest common subsequence, and "min(|X|,|Y|)" represents a length of a shorter one of the to-be-analyzed system call sequence and the reference system call sequence.

2. The machine-implemented method as claimed in claim 1, further comprising the step of:
   (D) configuring the processor to perform the following sub-steps when the degree of similarity determined in step (B) is greater than the predefined similarity threshold value:
   (D-1) obtaining, for each element of the longest common subsequence, an original position in each of the to-be-analyzed system call sequence and the reference system call sequence,
   (D-2) determining, for each element of the longest common subsequence, a difference between the original positions in the to-be-analyzed system call sequence and the reference system call sequence,
   (D-3) determining a total number of unique values of the differences found for the longest common subsequence,
   (D-4) determining a shifting degree (R) between the to-be-analyzed system call sequence and the reference system call sequence according to R=N/L, where "N" represents the total number determined in sub-step (D-3) and "L" represents the length of the longest common subsequence,
   (D-5) determining that the to-be-analyzed software is neither the known malware nor a variant of the known malware when the shifting degree (R) determined in sub-step (D-4) is greater than a predefined shifting threshold value, and (D-6) determining that the to-be-analyzed software is the known malware or a variant of the known malware when the shifting degree determined in sub-step (D-4) is not greater than the predefined shifting threshold value.

3. The machine-implemented method as claimed in claim 2, wherein the predefined similarity threshold value ranges between 0.58 and 0.63, and the predefined shifting threshold value ranges between 0.05 and 0.08.

4. The machine-implemented method as claimed in claim 3, wherein the predefined similarity threshold value is 0.6, and the predefined shifting threshold value is 0.06.

5. The machine-implemented method as claimed in claim 1, wherein step (A) includes the sub-steps of:

(A-1) configuring the processor to execute the to-be-analyzed software, and record the plurality of system calls made in sequence as a result of executing the to-be-analyzed software; and (A-2) configuring the processor to extract, from the plurality of system calls recorded in sub-step (A-1), a primary portion that corresponds to the kernel functionality of the to-be-analyzed software so as to obtain the to-be-analyzed system call sequence.

* * * * *